United States Patent
Day (10) Patent No.: US 9,203,612 B1
(45) Date of Patent: Dec. 1, 2015

(54) SYSTEMS AND METHODS FOR CONTROLLING MEDIA DISTRIBUTION

(71) Applicant: Atlanta DTH Inc, Norcross, GA (US)

(72) Inventor: Michael Day, Norcross, GA (US)

(73) Assignee: Atlanta DTH, Inc., Norcross, GA (US)

( * ) Notice: Subject to any disclaimer, the term of this patent is extended or adjusted under 35 U.S.C. 154(b) by 0 days.

(21) Appl. No.: 14/293,305

(22) Filed: Jun. 2, 2014

(51) Int. Cl.
*G06F 7/04* (2006.01)
*H04L 9/08* (2006.01)

(52) U.S. Cl.
CPC .................................. *H04L 9/0822* (2013.01)

(58) Field of Classification Search
None
See application file for complete search history.

(56) References Cited

U.S. PATENT DOCUMENTS

| | | | |
|---|---|---|---|
| 6,205,549 B1 | 3/2001 | Pravetz | |
| 6,947,557 B1 | 9/2005 | Megiddo et al. | |
| 7,395,436 B1* | 7/2008 | Nemovicher | 713/193 |
| 7,580,521 B1 | 8/2009 | Spies et al. | |
| 2003/0081787 A1 | 5/2003 | Kallahalla et al. | |
| 2004/0151310 A1 | 8/2004 | Fu et al. | |
| 2005/0052685 A1 | 3/2005 | Herf et al. | |
| 2005/0086480 A1 | 4/2005 | Kerr et al. | |
| 2005/0193205 A1 | 9/2005 | Jacobs et al. | |
| 2008/0098212 A1* | 4/2008 | Helms et al. | 713/155 |
| 2010/0083137 A1 | 4/2010 | Shin et al. | |
| 2010/0325732 A1 | 12/2010 | Mittal et al. | |
| 2011/0007903 A1 | 1/2011 | Robert et al. | |
| 2011/0289318 A1 | 11/2011 | Zhang et al. | |
| 2012/0072723 A1 | 3/2012 | Orsini et al. | |
| 2013/0013931 A1 | 1/2013 | O'Hare et al. | |
| 2013/0067228 A1 | 3/2013 | Dewan et al. | |
| 2013/0124508 A1 | 5/2013 | Paris et al. | |
| 2013/0208893 A1 | 8/2013 | Shablygin et al. | |
| 2013/0279690 A1 | 10/2013 | Durham et al. | |
| 2014/0032924 A1 | 1/2014 | Durham et al. | |
| 2014/0196079 A1 | 7/2014 | Jannard et al. | |

OTHER PUBLICATIONS

"ZipaClip™ Delivers True Encrypted Video and Texting App", http://www.prnewswire.com/news-releases/zipaclip-delivers-true-encrypted-video-and-text, Jan. 28, 2013 (One (1) page).

Michael Carney, "Privacy Woes Gotcha Down? Trunx is Launching With Free and Unlimited Encrypted Photo Storage in the Cloud", http://pando.com/2013/11/22/privacy-woes-gotcha-down-trunx-is-launching-with-free-and-unlimited-encrypted-photo-storage-in-the-cloud/, Nov. 22, 2013, (twelve (12) pages).

"Lockbox Launches Private and Secure File-Viewing App for iPad and iPhone", Sep. 19, 2013, (two (2) pages).

"Protect Yourself—Watermarking Video", http://www.videomaker.com/article/15431-protect-yourself-watermarking-video, Aug. 2012, (six (6) pages).

(Continued)

*Primary Examiner* — Brandon Hoffman
(74) *Attorney, Agent, or Firm* — Crowell & Moring LLP (57) ABSTRACT

Media file distribution is be controlled by encrypting the media file by an application executed on a mobile device of the media file owner. The media file is encrypted using a media file encryption key. The media file encryption key is then separately encrypted using a public key of each intended recipient, and the encrypted media file encryption key is appended to the encrypted media file. Accordingly, only intended recipients will have the complementary private key to allow decryption of the encrypted media file encryption key, which once decrypted can be used to decrypt the encrypted media file itself.

18 Claims, 11 Drawing Sheets

(56) References Cited

OTHER PUBLICATIONS

Appburst, LLC, "Protected Photo Sharing: Sneak a Peak", Jan. 17, 2012, https://itunes.apple.com/us/app/protected-photo-sharing-sneak/id425290761?mt=8, (three (3) pages).

Islam et al., "Application of Homomorphism to Secure Image Sharing", 2011, (two (2) pages).

Software OPS LLC, "Photo Safe Pro by My Eyes Only", 2014, https://itunes.apple.com/us/app/photo-safe-pro-by-my-eyes-only/id402544816?mt=8, (three (3) pages).

PCT/US15/33495, International Search Report (PCT/ISA/220 and PCT/ISA/210) dated Aug. 26, 2015, enclosing Written Opinion of the International Searching Authority (PCT/ISA/237) (Seven (7) pages).

* cited by examiner

| Track List Management |
|---|
| 001 ☐ Charlie: 2014678110 |
| 002 ☐ Cathy: 2014589119 |
| 003 ☐ David: 2014589123 |
| 004 ☐ Alex: 2034500012 |
| 005 ☐ Scott: 2034500035 |
| 006 ☐ Vivian: 2034500024 |
| 007 ☐ Kelly: 2034500900 |
| New Delete Edit Group Back |

FIG. 9

| Track List Management |
|---|
| My Track Group List |
| ☐ Family ▸ |
| ☐ Colleague ▸ |
| ☐ Friend ▸ |
| ☐ Business ▸ |
| New Delete Edit List Back |

SYSTEMS AND METHODS FOR CONTROLLING MEDIA DISTRIBUTION

BACKGROUND THE INVENTION

Exemplary embodiments of the present invention relate to systems and methods for controlling the distribution of media files.

Mobile devices, such as smart phones, tablets, and the like, are commonly used to capture pictures and videos, store them as media files, and distribute the stored media files to others. Because mobile devices provide a relatively easy way to distribute of media files, media files may be distributed beyond the intended recipient(s). For example, if Bob shares a media file with Cathy by e-mail or instant messaging, then Cathy can simply forward the media file to whomever she wishes. Bob's only way to control the further distribution of the media file is to ask Cathy not to further distribute it. Relying upon the trust of others to control distribution of media files is less than ideal because even if Bob currently has a very strong relationship with Cathy, this relationship may change and he may not trust her to control the distribution of the media file in view of the changed relationship.

SUMMARY OF THE INVENTION

Exemplary embodiments of the present invention relate to systems and methods for controlling the distribution of media files. In accordance with exemplary embodiments of the present invention, media file distribution can be controlled by encrypting the media file by an application executed on a mobile device of the media file owner. The media file is encrypted using a media file encryption key. The media file encryption key is then separately encrypted using a public key of each intended recipient, and the encrypted media file encryption key is appended to the encrypted media file. Accordingly, only intended recipients will have the complementary private key to allow decryption of the encrypted media file encryption key, which once decrypted can be used to decrypt the encrypted media file itself.

The encrypted media file can also include a header with distribution restrictions, which control whether the encrypted media file can be redistributed by an intended recipient. If the distribution restrictions allow redistribution, the intended recipient can encrypt the media file encryption key using a further intended recipient's public key, so that the further intended recipient can use its private key to obtain the media file encryption key, which can then be used to decrypt the encrypted media file.

By encrypting the media file encryption key using an intended recipient's public key and including distribution restrictions along with the encrypted media file, the owner of the media file has more control over the extent of distribution of any of the owner's media files. Further, the load on the server storing the keys is reduced because each intended recipient is able to obtain the media file encryption key using their own private key, and thus the recipients do not need to separately obtain the media file encryption key from the server.

DETAILED DESCRIPTION OF THE DRAWINGS

The description that follows describes an application executed by a mobile device to perform various functions. Those skilled in the art will recognize that mobile devices typically include one or more processors (e.g., a microprocessor, field programmable gate array (FPGA), application specific integrated circuit (ASIC)) and one or more memories to execute applications and perform the functions required by the applications. Accordingly, further details of the operations of such processors and memories are omitted in the description below for the sake of clarity.

Figure 1:
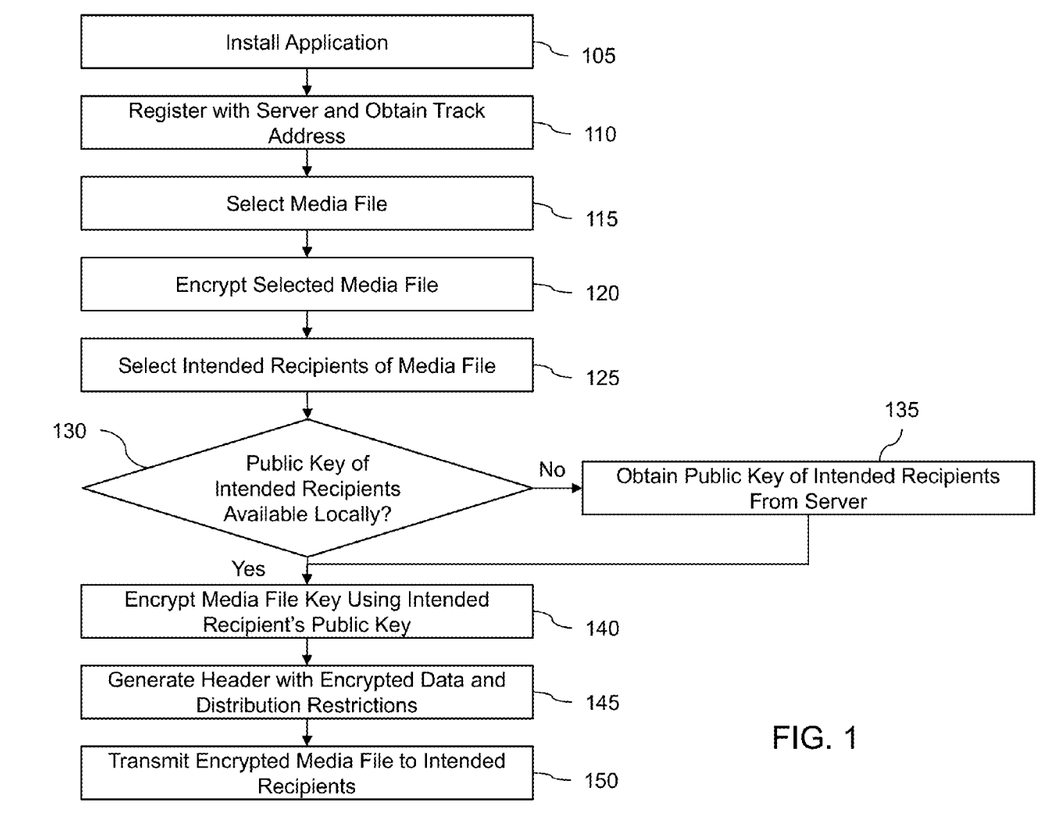
FIG. 1 is a flow diagram illustrating a method for transmitting encrypted media files in accordance with exemplary embodiments of the present invention.
Figure 2:
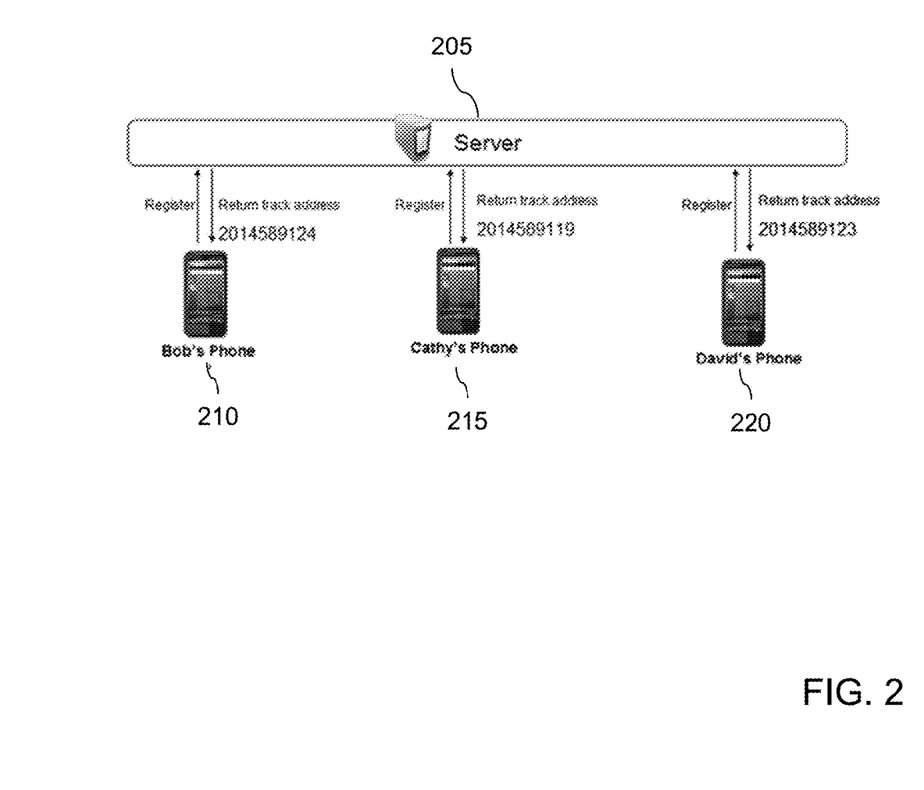
FIG. 2 is a block diagram illustrating an exemplary system in accordance with the present invention.
Figure 3:
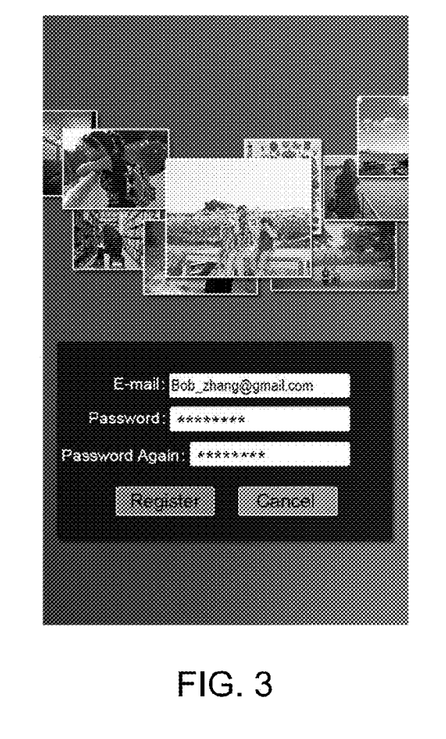
FIGS. 3 and 4 are schematic diagrams of displays for registration in accordance with exemplary embodiments of the present invention.
Figure 4:
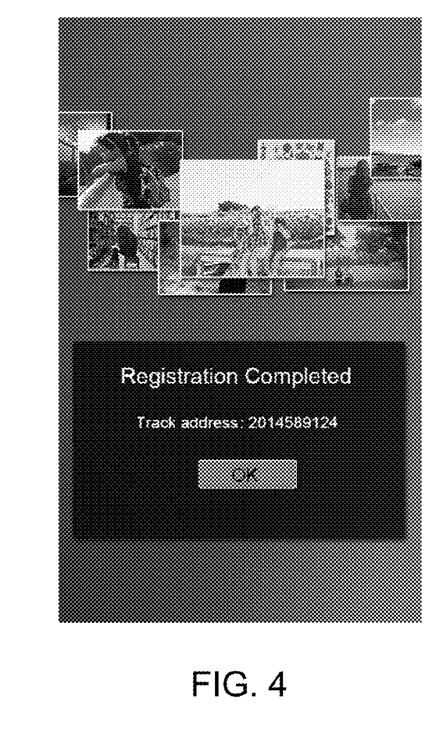

FIG. 1 is a flow diagram illustrating a method for the owner of a media file to encrypt the media file and transmit the encrypted media file in accordance with exemplary embodiments of the present invention. As used herein, the owner of the media file is the person that performs the initial encryption of the media file. Thus, for example, a person who encrypts a non-copyrighted picture or video that was obtained elsewhere would still be considered the media file owner in the context of the present invention even though that person does not own the media file from a copyright perspective. Initially, the application of the present invention is installed on the owner's mobile device (step 105). When the application is executed for the first time the owner is prompted to register with a server and the application receives a unique identifier, herein referred to as a track address (step 110). Specifically, the mobile device displays the screen illustrated in FIG. 3, which prompts the user of the mobile device to provide an e-mail address and password. As illustrated in FIG. 2, the e-mail address and password are sent in registration messages from mobile devices 210-220 to server 205. If the registration is successful the mobile device is provided with the track address and the mobile device displays the screen illustrated in FIG. 4 confirming that the registration is successful and displaying the assigned track address. The registration process also generates a complementary pair of public and private keys for the owner, the public key being stored in the server 205 and the private key being stored in the mobile device of the registered user.

Figure 5:
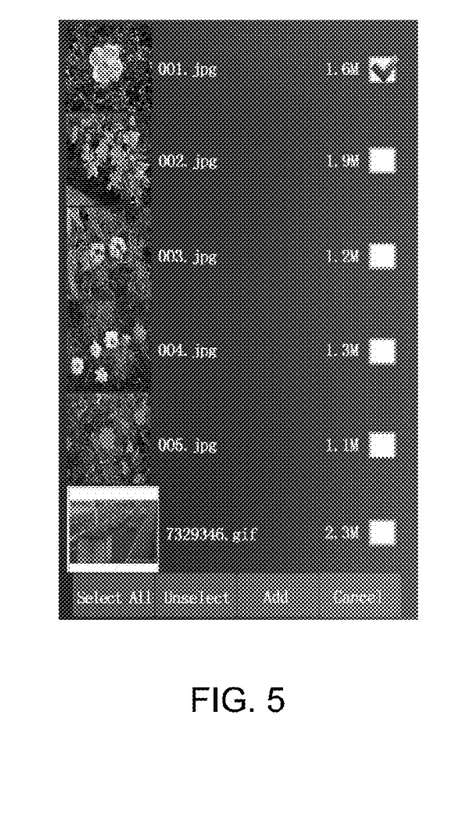
FIGS. 5 and 6 are schematic diagrams of displays for selecting images and videos, respectively, in accordance with exemplary embodiments of the present invention.
Figure 6:
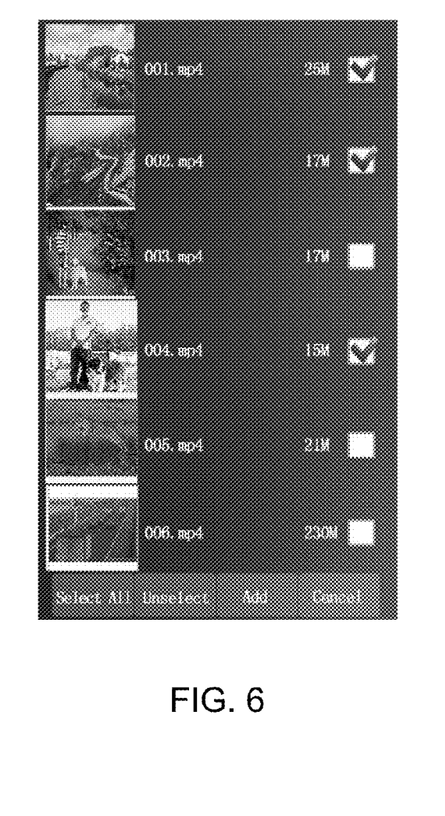

Once registration is complete and a track address is obtained, the user can use the application to select a media file, which is one of a picture and video (step 115). Exemplary screens allowing a user of the mobile device to select a picture and video are respectively illustrated in FIGS. 5 and 6. As illustrated in these figures, the user can select individual pictures or videos, select all pictures or videos, unselect some of the pictures or videos, add pictures or videos, and cancel this operation.

The selected media file is then encrypted with a media file encryption key (step 120). For example, referring to FIG. 7, Bob has selected the media file Original Flower.jpg, and the application on Bob's phone 210 encrypts the image Flower.jpg using the key $K_{aes\_flower}$ using the AES256 encryption method to produce the encrypted picture encrypted Flower.jpg. The encryption key used to initially encrypt the picture can be generated by the mobile device or the mobile device can obtain it from the server. It should be recognized that any type of encryption technique can be used with the present invention. As will be described in more detail below, the media file encryption key $K_{aes\_flower}$ is separately encrypted with each intended recipient's public encryption key and appended to the end of the media file so that each intended recipient can obtain the media file decryption key $K_{aes\_flower}$ using the recipients private key.

Figure 8:
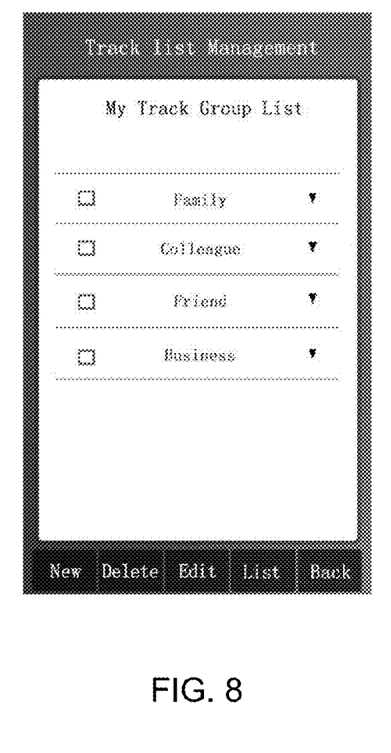
FIG. 8 is a schematic diagram of a display of contact groups in accordance with exemplary embodiments of the present invention.
Figure 9:
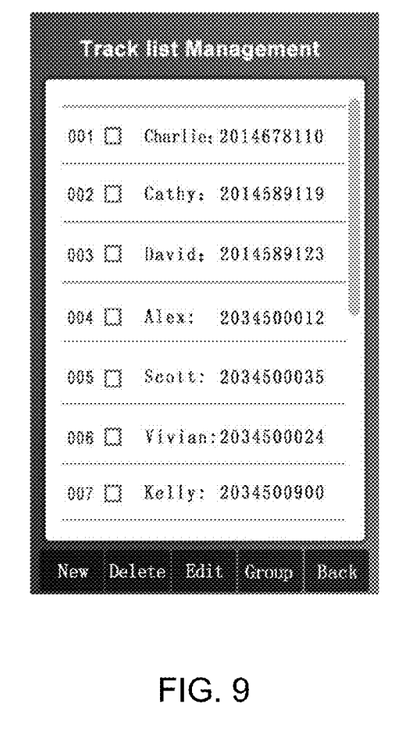
FIG. 9 is a schematic diagram of a display of contacts in accordance with exemplary embodiments of the present invention.
Figure 10:
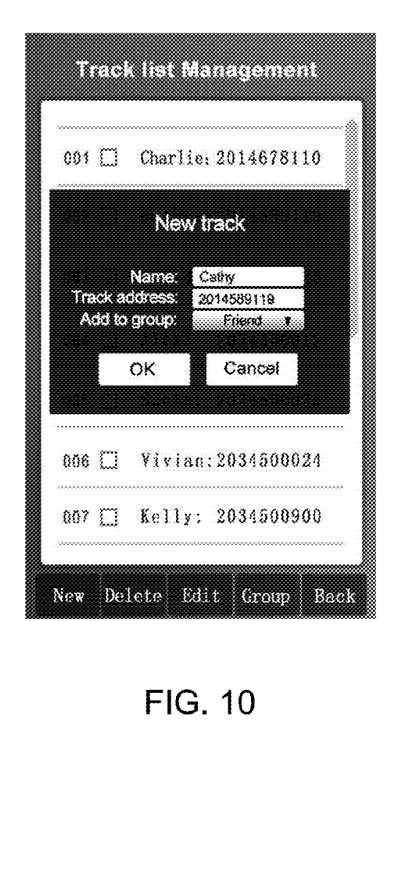
FIG. 10 is a schematic diagram of a display for adding a contact in accordance with exemplary embodiments of the present invention.
Figure 11:
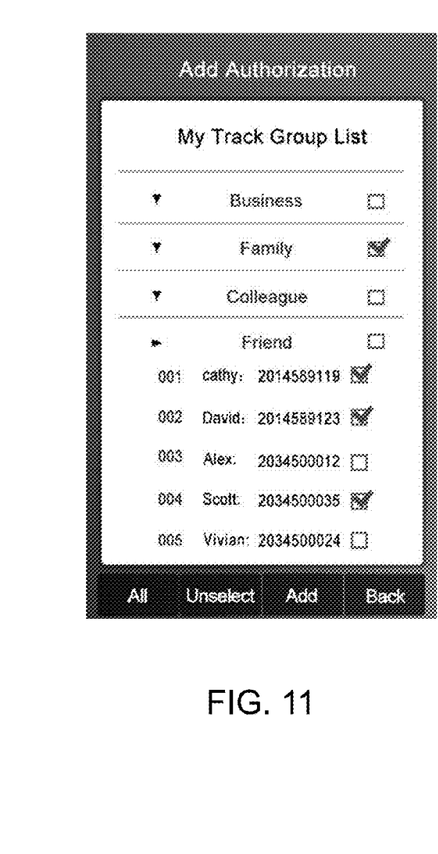
FIG. 11 is a schematic diagram of a display for adding authorization for decrypting media files in accordance with exemplary embodiments of the present invention.

The user of the mobile device then selects one or more intended recipients for the media file (step 125). This selection can be performed using the exemplary screens illustrated in FIGS. 8-11. Specifically, FIG. 8 illustrates a screen where contacts are organized into different groups, and accordingly the sender can select an entire group as the intended recipient or can select a group to access one or more intended recipients within a group. FIG. 9 illustrates an exemplary screen where the contacts are not grouped. As illustrated in FIG. 9, each contact includes a contact name and a track address. Accordingly, if a contact is not current stored in the contact list of the application, the user can add a contact by entering the contact's name and track address, as well as a designated group (if desired), which is illustrated in FIG. 10. Finally, FIG. 11 illustrates the selection of the contacts in the "Family" group as well as particular contacts in the "Friend" group as intended recipients.

Once one or more intended recipients are selected (step 125), the application determines whether a public key is stored locally within the device for each of the selected intended recipients (step 130). The public key would be locally stored if, for example, an encrypted media file was previously sent to the selected intended recipients. If the public key is not locally stored for at least one of the intended recipients ("No" path out of decision step 130), then the public key is obtained from a server (step 135). Specifically, referring again to FIG. 7, assuming that Bob wanted to send an encrypted media file to Cathy and his device did not already contain Cathy's public key, Bob's phone 210 would send a request to server 205, where the request includes Cathy's track address. The server would then provide Bob's phone 210 with Cathy's public key.

If the intended recipient's public key is already stored locally within the sender's device ("Yes" path out of decision step 130) or after the public key is obtained from the server (step 135), the media file key is encrypted with the intended recipient's public key (step 140). For example, referring again to FIG. 7, the application on Bob's phone 210 encrypts the media file key $K_{aes\_flower}$ using Cathy's public key $K_{pub\_cathy}$, which is then appended at the end of the encrypted media file.

Figure 7:
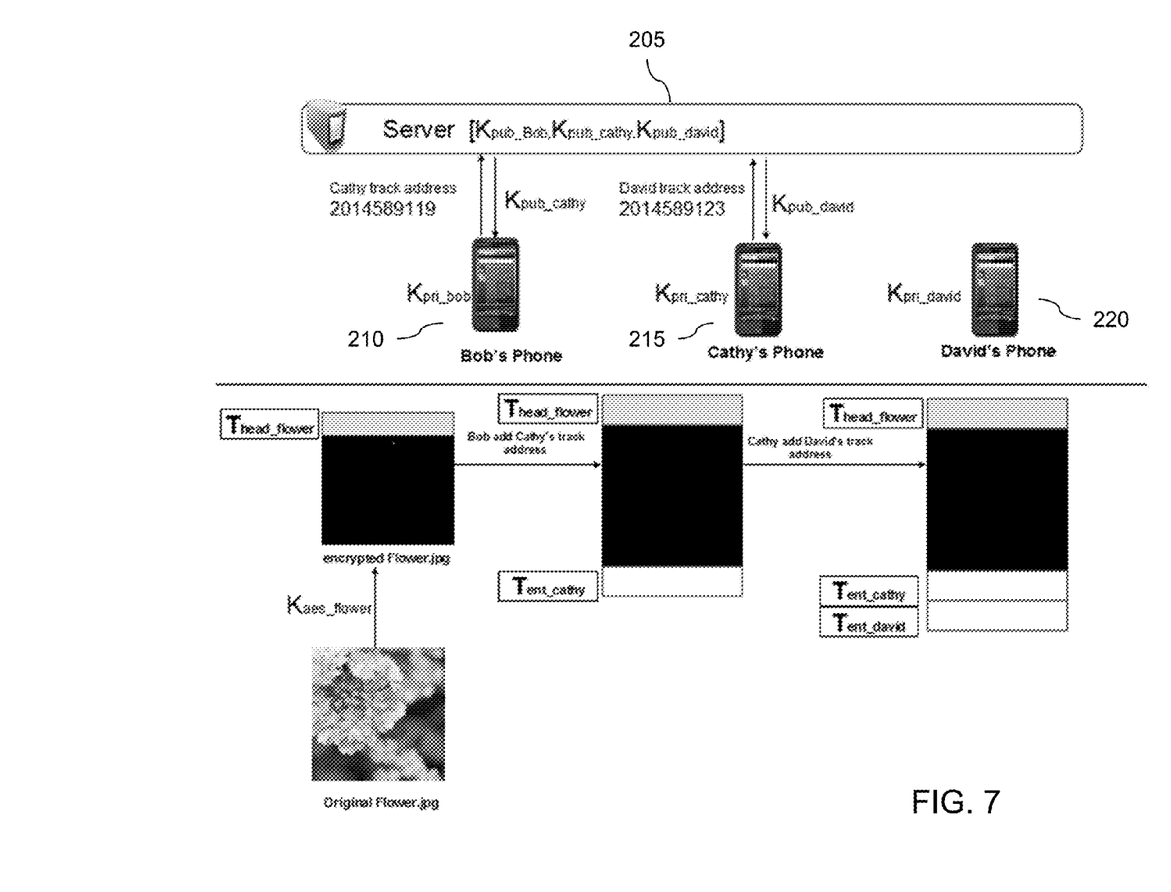
FIG. 7 is a block diagram illustrating a method for encrypting media files in accordance with exemplary embodiments of the present invention

Once the media file key is encrypted (step 140), then a header is generated, which includes encrypted data and publish control information (herein referred to as distribution restrictions) (step 145). The encrypted data is generated by applying Bob's public key $K_{pub\_bob}$ to the media file encryption key $K_{aes\_flower}$. Because Bob's phone 210 is the only phone that has his private key $K_{pri\_bob}$, only Bob's phone 210 would be able to decrypt the encrypted information in the header $T_{head\_flower}$.

Figure 12:
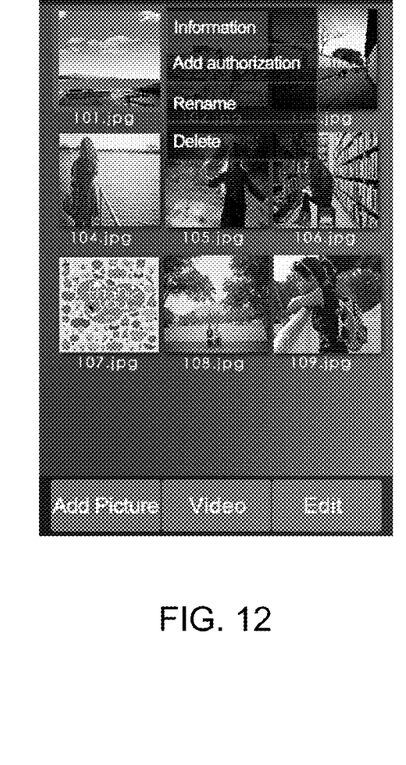
FIGS. 12 and 13 are schematic diagrams of displays for encrypting images and videos, respectively, in accordance with exemplary embodiments of the present invention.
Figure 13:
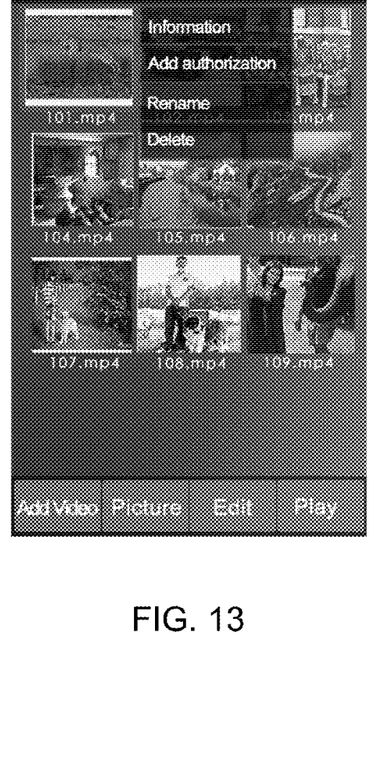
Figure 14:
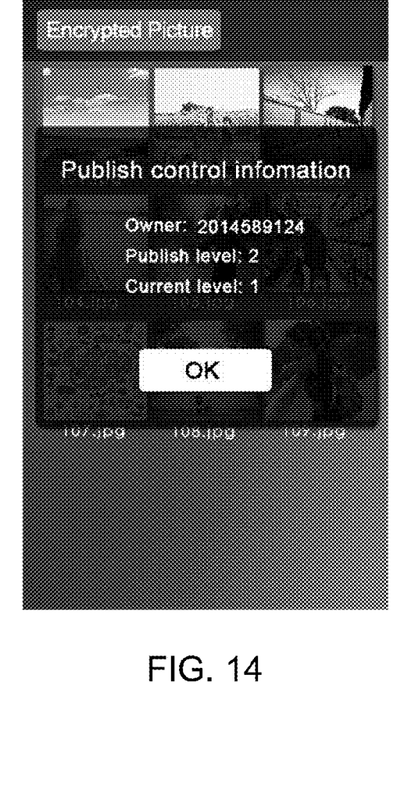
FIGS. 14 and 15 are schematic diagrams of displays for controlling the distribution of media files in accordance with exemplary embodiments of the present invention.

The distribution restrictions can indicate whether the intended recipient is allowed to redistribute the encrypted media file. For example, referring to FIGS. 12 and 13, the sender can select an encrypted picture (FIG. 12) or an encrypted video (FIG. 13) and select "Add Authorization" to indicate whether additional recipients are authorized. To determine the current distribution restrictions the sender (or any recipient) can select "Information", which would provide the screen illustrated in FIG. 14. The exemplary screen in FIG. 14 identifies the owner of the media file using the track identification, the number of times the encrypted media file can be redistributed (i.e., the Publish level) and the current distribution level of the encrypted media file (i.e., the Current level). In the example illustrated in FIG. 14 the Publish level of "2" indicates that the encrypted media file can be redistributed only by recipients that have received the encrypted media file from the owner of the media file. The Current level of 1 indicates that the encrypted media file has not yet been distributed by the owner. Thus, as described below, the application on each intended recipient's device increments the Current level before the encrypted media file is redistributed, assuming that such redistribution is allowed.

The application is designed so that only the media file owner is able to modify the distribution restrictions. This control is achieved by the application requiring that a mobile device first be able to decrypt the encrypted $K_{aes\_flower}$ in the header $T_{head\_flower}$ prior to allowing any changes to the distribution restrictions.

Figure 15:
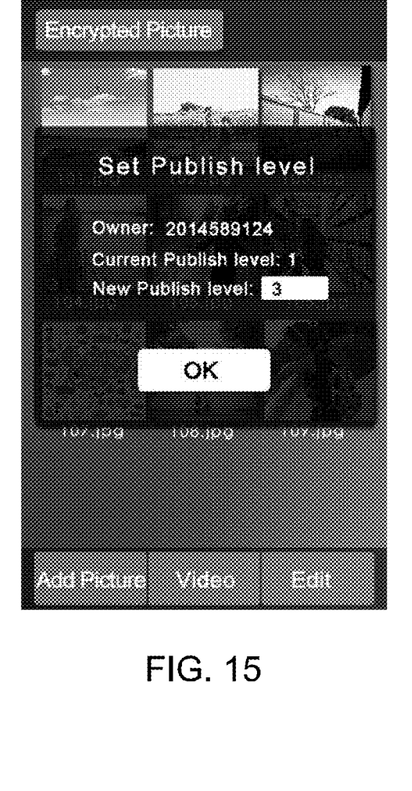

If the owner of the media file wants to modify the distribution restrictions by selecting "Add Authorization", the exemplary screen illustrated in FIG. 15 is presented to the owner. Thus, if desired, the media file owner can increase the Publish level to allow further distribution of the encrypted media file, which in the example illustrated in FIG. 15 would be to change the distribution from Publish level 1 (which allows only the media file owner to distribute it and does not allow any redistribution by recipients), to Publish level 3 (which allows redistribution by an initial recipient of the media file from the media file owner, as well as redistribution from anyone that received the redistribution from the initial recipient). It should be noted that although the Publish level controls the number of redistributions it does not control the number of recipients. Thus, for example, if Cathy received an encrypted media file from Bob (the file owner) that includes a Publish level 2 and a Current level 1, Cathy can redistribute the encrypted media file to a single further recipient or many further recipients.

Finally, the header $T_{head\_flower}$ also includes an $H_{mac}$ message, which is a type of checksum generated using the distribution restrictions and which allows a device to determine whether there has been any inappropriate tampering with the distribution restrictions. Thus, if Bob's phone 210 modifies the distribution restrictions, the application would also modify the $H_{mac}$ message.

Once the header is generated (step 145), the owner transmits the encrypted media file to the intended recipients (step 150). This transmission function can be integrated into the application or can be performed by a separate application, such as an electronic mail or instant messaging application. The transmission function can also include posting to a website, such as a social media website, a media file sharing website, a blog, etc. Because the media file is encrypted, the website can be publically-accessible because only an authorized recipient will be able to decrypt the media file in the manner described below. In other words, although an unauthorized recipient can download the encrypted media file from the website to which it was posted, the unauthorized recipient would not be able to view the media file because the unauthorized recipient would not be able to decrypt it.

Figure 16:
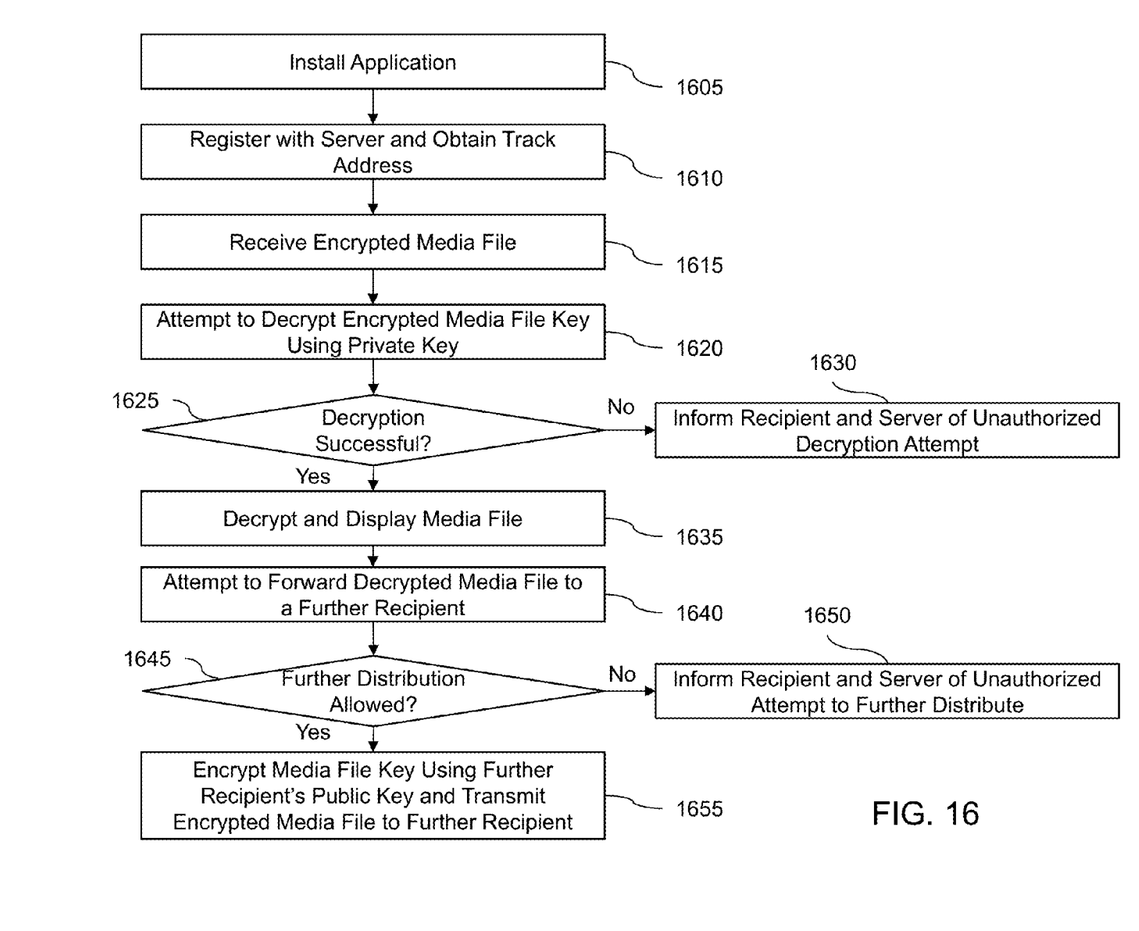
FIG. 16 is a flow diagram illustrating a method for receiving encrypted media files in accordance with exemplary embodiments of the present invention.

FIG. 16 is a flow diagram illustrating a method for receiving encrypted media files in accordance with exemplary embodiments of the present invention. Initially, a recipient must install the application (step 1605) and register with the server to obtain a track address (step 1610). These steps can be performed at any time but must be performed prior to the sending of an encrypted media file because otherwise the sender would not have a track address to address the encrypted media file. Once a user is registered and receives a track address the user can receive encrypted media files (step 1615). The encrypted media files can be received in any manner, including as an attachment to an e-mail, in a text or chat message, or downloading from a website.

When the encrypted media file has been received (step 1615) and that user wishes to view the encrypted media file, the user launches the application of the present invention on his/her mobile device, selects the encrypted media file using the application, and the application attempts to decrypt the encrypted media file key that is at the end of the encrypted media file using the recipient's private key (step 1620). It will be recognized that a particular person's public key and private key are complementary keys and that encryption with a particular person's public key means the encrypted media file can only be decrypted using that particular person's private key. For example, referring again to FIG. 7, Cathy's phone is able to obtain the media file encryption key from $T_{ent\_cathy}$ because it was encrypted with Cathy's public key and her phone includes the complementary private key. If Cathy's phone 215 simply forwarded the same message that was received by her phone 215 to David's phone 220, David's phone 220 could not decrypt the encrypted media file because David's phone 220 could not decrypt the encrypted media file encryption key, as David's phone 220 does not have Cathy's private key.

Figure 17:
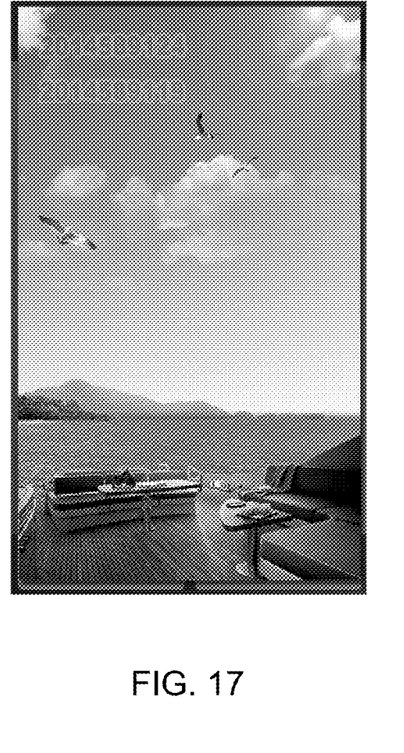
FIGS. 17 and 18 are schematic diagrams of displays of watermarked, decrypted media files in accordance with exemplary embodiments of the present invention.

If the media file key was not encrypted with the recipient's public key then the decryption attempt will be unsuccessful ("No" path out of decision step 1625) and the recipient is informed of the unauthorized decryption attempt (step 1630). The application can also inform the server of the unsuccessful decryption attempt and the server can notify the media file owner. If, however, the media file key was encrypted with the recipient's public key then the decryption is successful ("Yes" path out of decision step 1625) and the encrypted media file is decrypted using the media file key and is displayed on the recipient's mobile device (step 1635). In accordance with exemplary embodiments of the present invention, the displayed media file can include a watermark with the track address of the owner and the recipient, an example of which is illustrated in FIG. 17.

If the recipient decides to redistribute the decrypted media file to a further recipient (step 1640), the application on the recipient's mobile device reviews the distribution restrictions in the media file to determine whether further distribution is allowed (step 1645). If the distribution restrictions indicate that further distribution is not allowed ("No" path out of decision step 1645), then the recipient is informed that the media file may not be further distributed without authorization from the owner (step 1650).

Figure 18:
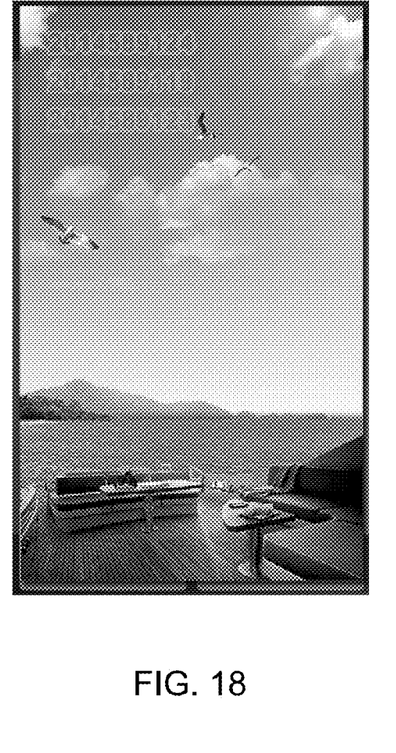

If, however, the distribution restrictions indicate that further distribution is allowed ("Yes" path out of decision step 1645), then the media file key is encrypted with the further recipient's public key and transmit the encrypted media file to the further recipient (step 1655). For example, referring again to FIG. 7, if Cathy wanted to redistribute the media file to David, the application on Cathy's phone 215 would provide David's track address to the server 205, which would then return David's public key $K_{pub\_david}$. The application on Cathy's phone 215 would then take the decrypted media file key $K_{aes\_flower}$ and encrypt it using David's public key $K_{pub\_david}$, add the encrypted media file key to the end of the media file $T_{ent\_david}$, and transmit the encrypted media file to David's phone 220. David's phone 220 would then use David's private key $K_{pri\_david}$ to decrypt the media file key, use the decrypted media file key $K_{aes\_flower}$ to decrypt the encrypted image, and, as illustrate in FIG. 18, the displayed media file would include a watermark with the track addresses of the owner Bob, the first intended recipient Cathy, and David.

The decrypted media file and the decrypted media file key are accessible only within the application of the present invention and is not otherwise available on the recipient's mobile device. This ensures that a recipient cannot simply forward the decrypted media file because the decrypted file is only available to the application, which prevents unauthorized redistribution.

It should be recognized that the methods of FIGS. 1 and 16 were described above in connection with the exemplary serial distribution scenario illustrated in FIG. 7. It should be recognized that the media file owner can initially include a number of encrypted media file encryption keys at the end of the encrypted media file and then send this to multiple initial intended recipients. Similarly, to the extent allowed by the distribution restrictions, an intended recipient could include a number of encrypted media file encryption keys at the end of the encrypted media file and then send this to multiple further intended recipients.

The description above uses examples of mobile devices that are referred to as phones. It will be recognized that this is merely exemplary and that the present invention can be employed with any type of mobile device, including mobile telephones, tablets, personal digital assistants (PDAs), and the like.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method, comprising:
   receiving, by an application executed on a first mobile device, a selection of a media file, wherein the media file is a picture or video, wherein the first mobile device is associated with an owner of the media file;
   receiving, by the application, an intended recipient of the selected media file;

encrypting, by the application, the media file using a media file encryption key to produce an encrypted media file;

encrypting, by the application, the media file encryption key using a public key of the intended recipient;

attaching the encrypted media file encryption key to the encrypted media file; and transmitting, by the application, the encrypted media file and attached encrypted media file encryption key to the intended recipient;

receiving, by a second application on a second mobile device associated with the intended recipient, the encrypted media file;

decrypting, by the second application, the encrypted media file key using a private key of the intended recipient to produce the media file encryption key;

determining, by the second application, whether the received encrypted media file includes distribution restrictions indicating whether the encrypted media file can be redistributed by the recipient, wherein when the distribution restrictions indicate that the encrypted media file can be redistributed, the method further comprises receiving, by the second application, a further intended recipient of the decrypted media file;

encrypting, by the second application, the media file encryption key using a public key of the further intended recipient;

attaching the media file encryption key encrypted using the public key of the further intended recipient to the encrypted media file; and transmitting, by second application, the encrypted media file with the attached media file encryption key encrypted using the public key of the further intended recipient to the further intended recipient.

2. The method of claim 1, further comprising:

decrypting, by the second application, the encrypted media file using the media file encryption key; and reproducing, by the second application, the decrypted media file on a screen of the second mobile device.

3. The method of claim 2, wherein the decrypted media file is reproduced with a watermark on the screen of the second mobile device.

4. The method of claim 3, wherein the watermark includes an identification of the owner of the media file and the intended recipient.

5. The method of claim 2, further comprising:

receiving, by the application executed on the first mobile device, the distribution restrictions for the selected media file; and adding, by the application executed on the first mobile device, the distribution restrictions to the encrypted media file.

6. The method of claim 1, further comprising:

receiving, by the application, an identification of the intended recipient;

transmitting, by the application to a server, the identification of the intended recipient; and receiving, by the application from the server, the public key of the intended recipient.

7. The method of claim 6, further comprising:

storing, by the application, the identification of the intended recipient and the public key of the intended recipient;

receiving, by the application, a recipient group for the intended recipient; and displaying, by the application, the intended recipient in the recipient group on a screen of the first mobile device.

8. The method of claim 1, wherein the transmission of the encrypted media file is by electronic mail or instant messaging.

9. The method of claim 1, wherein the transmission of the encrypted media file is by posting the encrypted media file on a website.

10. The method of claim 1, wherein when the application executed on the first mobile device receives a selection of a plurality of intended recipients of the selected media file, the application separately encrypts the media file key using a public key of each of the selected plurality of intended recipients and attaches each of the separately encrypted media file keys to the encrypted media file prior to transmitting the encrypted media file.

11. The method of claim 1, wherein the distribution restrictions indicate a number of possible redistributions of the encrypted media file and a current number of distributions of the encrypted media file.

12. The method of claim 11, wherein the second application increments the current number of distributions and includes the number of possible distributions and the incremented current number of distributions in the further encrypted file.

13. A method, comprising:

receiving, by an application executed on a first mobile device, a selection of a media file, wherein the media file is a picture or video, wherein the first mobile device is associated with an owner of the media file;

receiving, by the application, an intended recipient of the selected media file;

encrypting, by the application, the media file using a media file encryption key to produce an encrypted media file;

encrypting, by the application, the media file encryption key using a public key of the intended recipient;

attaching the encrypted media file encryption key to the encrypted media file;

transmitting, by the application, the encrypted media file and attached encrypted media file encryption key to the intended recipient;

receiving, by a second application on a second mobile device associated with the intended recipient, the encrypted media file;

decrypting, by the second application, the encrypted media file key using a private key of the intended recipient to produce the media file encryption key;

decrypting, by the second application, the encrypted media file using the media file encryption key; and reproducing, by the second application, the decrypted media file on a screen of the second mobile device;

receiving, by the application executed on the first mobile device, distribution restrictions for the selected media file; and adding, by the application executed on the first mobile device, the distribution restrictions to the encrypted media file, wherein the distribution restrictions indicate whether the encrypted media file can be redistributed by the recipient, wherein when the distribution restrictions indicate that the encrypted media file can be redistributed, the method further comprises receiving, by the second application, a further intended recipient of the decrypted media file;

encrypting, by the second application, the media file encryption key using a public key of the further intended recipient;

attaching the media file encryption key encrypted using the public key of the further intended recipient to the encrypted media file; and transmitting, by second application, the encrypted media file with the attached media file encryption key encrypted using the public key of the further intended recipient to the further intended recipient.

14. The method of claim 13, wherein the distribution restrictions indicate a number of possible redistributions of the encrypted media file and a current number of distributions of the encrypted media file.

15. The method of claim 14, wherein the second application increments the current number of distributions and includes the number of possible distributions and the incremented current number of distributions in the further encrypted file.

16. A method, comprising:

receiving, by a second application executed on a second mobile device from a first application executed on a first mobile device, an encrypted media file, wherein the first mobile device is associated with an owner of the media file, the second mobile device is associated with an intended recipient of the encrypted media file, the media file is encrypted using a media file encryption key, the media file encryption key is encrypted using a public key of intended recipient, and the encrypted media file encryption key is attached to the received encrypted media file;

decrypting, by the second application, the encrypted media file key using a private key of the intended recipient to produce the media file encryption key;

determining, by the second application, whether the received encrypted media file includes distribution restrictions indicating whether the encrypted media file can be redistributed by the recipient, wherein when the distribution restrictions indicate that the encrypted media file can be redistributed, the method further comprises receiving, by the second application, a further intended recipient of the decrypted media file;

encrypting, by the second application, the media file encryption key using a public key of the further intended recipient;

attaching the media file encryption key encrypted using the public key of the further intended recipient to the encrypted media file; and transmitting, by second application, the encrypted media file with the attached media file encryption key encrypted using the public key of the further intended recipient to the further intended recipient.

17. The method of claim 16, wherein the distribution restrictions indicate a number of possible redistributions of the encrypted media file and a current number of distributions of the encrypted media file.

18. The method of claim 17, wherein the second application increments the current number of distributions and includes the number of possible distributions and the incremented current number of distributions in the further encrypted file.

* * * * *